United States Patent [19]

Zifferer et al.

[11] Patent Number: 4,991,076
[45] Date of Patent: Feb. 5, 1991

[54] METHOD AND APPARATUS FOR CREATING CUSTOM DISPLAYS FOR MONITORING LADDER LOGIC PROGRAMS

[75] Inventors: Scott C. Zifferer, Mequon; Joseph J. Menter, Jr., Milwaukee, both of Wis.

[73] Assignee: ICOM Inc., West Allis, Wis.

[21] Appl. No.: 373,826

[22] Filed: Jun. 30, 1989

[51] Int. Cl.⁵ .................. G05B 9/02; G05B 11/02; G05B 19/42
[52] U.S. Cl. ................................. 364/147; 364/188; 364/192; 364/551.02
[58] Field of Search ............... 364/136, 140, 141, 143, 364/188, 191, 192, 147, 474.11, 474.16–474.27, 551.01, 551.02; 340/825.06, 825.22, 825.23

[56] References Cited

U.S. PATENT DOCUMENTS

| | | |
|---|---|---|
| 3,686,639 | 8/1972 | Fletcher et al. . |
| 3,813,649 | 5/1974 | Struger et al. . |
| 3,882,305 | 5/1975 | Johnston . |
| 3,964,026 | 6/1976 | Wanauchi et al. . |
| 3,964,026 | 6/1976 | Yamauchi et al. . |
| 4,038,533 | 7/1977 | Dummermuth et al. . |
| 4,200,914 | 4/1980 | Kintner . |
| 4,227,247 | 10/1980 | Kintner . |
| 4,244,034 | 1/1981 | Cherba . |
| 4,247,901 | 1/1981 | Martin et al. . |
| 4,316,260 | 2/1982 | Hideshima . |
| 4,396,974 | 8/1983 | Imazeki et al. . |
| 4,415,965 | 11/1983 | Imazeki . |
| 4,445,169 | 4/1984 | Wakiti et al. . |
| 4,449,180 | 5/1984 | Ohshima et al. . |
| 4,486,830 | 12/1984 | Taylor, Jr., et al. ............. 364/146 |
| 4,488,258 | 12/1984 | Struger et al. . |
| 4,504,900 | 3/1985 | Yomogida et al. . |
| 4,513,379 | 4/1985 | Wilson et al. . |
| 4,533,997 | 8/1985 | Furgerson ...................... 364/200 |
| 4,616,307 | 10/1986 | Kusumi et al. . |
| 4,635,183 | 1/1987 | Isobe et al. ..................... 364/188 |
| 4,644,478 | 5/1987 | Stephens et al. ............... 364/188 |
| 4,661,899 | 4/1987 | Usuda ............................. 364/188 |
| 4,663,704 | 5/1987 | Jones et al. . |
| 4,703,414 | 10/1987 | Inoue et al. . |
| 4,718,025 | 1/1988 | Minor et al. . |
| 4,815,014 | 3/1989 | Lipner et al. .................. 364/188 |
| 4,833,592 | 5/1989 | Yamanaka ..................... 364/188 |
| 4,843,538 | 6/1989 | Lane et al. .................... 364/188 |

OTHER PUBLICATIONS

Allen-Bradley Company, Inc., Programming and Operations Manual, Bulletin #1772.
ICOM, Inc. *PLC-2 Ladder Logistics User's Manual*, Aug. 1987.
ICOM, Inc., *PLC-5 Ladder Logistics User's Manual*, Sep. 1987.
Taylor Industrial Software, *Product Bulletin #24*, Apr. 1987.
Taylor Industrial Software *Process Window Graphic Operator Station*.
ICOM, Inc., *PLC-3 Ladder Logistics User's Manual*, Sep. 1987.
Taylor Industrial Software, *Product Summary*, Feb. 1988.

*Primary Examiner*—Jerry Smith
*Assistant Examiner*—Jim Trammell
*Attorney, Agent, or Firm*—Merchant, Gould, Smith, Edell, Welter & Schmidt

[57] ABSTRACT

The present invention provides productivity aids for ladder logic programs for Programmable Logic Controllers (PLCs). The present invention discloses a software package embodying a method of creating custom screens for displaying the values and status of bits and words in a PLC as a ladder logic program executing therein is monitored. Any combination of bits and words can be displayed by the custom screens. This Custom Data Monitor function is designed to simplify troubleshooting by giving the user the tools to develop screens that act as windows into user-selected Data Table locations in the PLC.

18 Claims, 13 Drawing Sheets

```
OFFLINE  Prj:FBDS5     Mode:Prog  Bkp:Dis Frc:No       RUNG 2:21/79
       ┌─[SEQ_TMR.ACC]─┬─[FRUIT_BRAN_TMR.ACC]─110   122─┬─[I:000/00]─────────130─┬─[O:000/00]
80─    │  Integer      │   Integer           112   124─┴─ Bit                132─┴─ Bit
82─    ├─[SEQ_TMR.PRE]─┼─[FRUIT_BRAN_TMR.PRE]─114   126─┬─[I:000/01]─────────134─┬─[O:000/00]
84─    │  Integer      │   Integer           116   128─┴─ Bit                136─┴─ Bit
86─    ├─[SEQ_TMR.DN]──┴─[FRUIT_BRAN_TMR.DN]──118
88─    │   Bit             Bit                120
90─    └
                                                                    ─60

Edit the Current Cell
 F1     F2      F3       F4       F5    F6      F7     F8      F9       F10
Edit   Clear  Binary  Integer    Hex  Octal    bcD   Float  Adrmode    Help
```

FIG. 7

| Maximum Number of Elements | File Type | File Number | 16-bit Words per Element |
|---|---|---|---|
| 32 | Output Image | 0 (290) | 1 |
| 32 | Input Image | 1 (292) | 1 |
| 32 | Status | 2 (294) | 1 |
| 1000 | Bit | 3 (296) | 1 |
| 1000 | Timer | 4 (298) | 3 |
| 1000 | Counter | 5 (300) | 3 |
| 1000 | Control | 6 (302) | 3 |
| 1000 | Integer | 7 (304) | 1 |
| 1000 | Floating Point | 8 (306) | 2 |
| 1000 | User Assigned | 9-999 (308) | 1 |

FIG. 15

| IF (Condition) | Then (Action) |
|---|---|
| Input Bit 01 is On | Turn Output Bit 01 On |
| (310) | (312) |

FIG. 16

Custom Screen File — 314

| | | |
|---|---|---|
| Cell #1 | Address | —316 |
| Cell #1 | Radix | —318 |
| Cell #2 | Address | —320 |
| Cell #2 | Radix | —322 |
| ⋮ | | |
| Cell #40 | Address | —324 |
| Cell #40 | Radix | —326 |

FIG. 17

Timing Chart Bitmap File — 328

| | | |
|---|---|---|
| Bit #1 | Address | —330 |
| Bit #2 | Address | —332 |
| Bit #3 | Address | —334 |
| Bit #4 | Address | —336 |
| Bit #5 | Address | —338 |
| Bit #6 | Address | —340 |
| ⋮ | | |
| Bit #16 | Address | —342 |

FIG. 18

METHOD AND APPARATUS FOR CREATING CUSTOM DISPLAYS FOR MONITORING LADDER LOGIC PROGRAMS

FIELD OF THE INVENTION

This invention relates generally to methods of developing ladder logic programs for Programmable Logic Controllers (PLCs). In particular, is directed to a method of creating custom screens for displaying the values and status of bits and words in a PLC as a ladder logic program executing therein is monitored.

BACKGROUND OF THE INVENTION

Programmable logic controllers (PLCs) perform many of the control functions for assembly line machines, machine tools, and other types of industrial equipment. For example, a part arriving at a workstation may contact and close a limit switch or other type of sensing device. As a result, an electrical circuit is completed or broken, and a signal is sent to a PLC indicating the change in condition. The PLC responds to the input as directed by a ladder logic program which, to a large degree, simulates the response of what used to be accomplished by older systems with a set of relays and other control devices. Ladder logic programs instruct the PLC how and when to react to the different signals it receives. The PLC, in turn, instructs the devices it controls in an appropriate manner as specified in the ladder logic program.

A PLC is comprised of a processor, memory, input modules, and output modules. FIG. 13 shows a PLC processor 274 and memory 276, wherein the PLC 272 is (optionally) connected 278 to a personal computer 280. Ladder logic programs may be developed on the personal computer 280 and then downloaded to the PLC 272. The PLC processor 274 executes the ladder logic program. The memory 276 stores output image tables, input image tables, timer storage, counter storage, and ladder logic program workspace. The input modules connect the PLC 272 to input devices and can receive both digital and analog signals. The output modules connect the PLC 272 to machines or other devices and can transmit either digital or analog signals to control them.

In most PLCs, such as those manufactured by the Allen-Bradley Company, memory is structured into "Data Table files" 290–308 as shown in FIG. 15. The memory may be divided into as many as 1000 different Data Table files 290–308. There are a plurality of different types of Data Table files 290–308, each serving a different purpose. These Data Table files 290–308 comprise the Input Image 292, Output Image 290, Status 294, Bit 296, Timer 298, Counter 300, Control 302, Integer 304, and Floating Point 306 files.

The Input Image Data Table file 292 maintains the status of inputs to the PLC. A single bit in the Input Image Data Table file 292 represents the status of a single I/0 point on an input module. If an input bit is ON, then a signal has been received at the input module. If the input bit is OFF, then no signal has been received at the input module.

The Output Image Data Table file 290 controls the outputs from the PLC. A single bit in the Output Image Data Table file 290 represents the status of a single I/0 point on an output module. If an output bit is ON, then the PLC sends a signal to the output module. If the output bit is OFF, then the PLC does not send a signal to the output module.

The Timer Data Table file 298 reflects the status of timers executing in the ladder logic program. Timers keep track of timed intervals according to the ladder logic program. Timers consist of Accumulated Values and Preset Values. The timer intervals are stored in the Timer Accumulators and typically have three bases: (1) 1.0 seconds; (2) 0.1 seconds; and (3) 0.01 seconds. Timer status bits indicate whether the timer is enabled and whether it has timed out.

The Counter Data Table file 300 reflects the status of counters executing in the ladder logic program. Counters accumulate the number of events that occur in a ladder logic program, wherein an event is defined as the transition from a condition of "false" to "true". Counters consist of Accumulated Values and Preset Values. Counter status bits indicate the following: whether the counter has overflowed or underflowed; whether the Accumulator Value is greater than or equal to the Preset Value (i.e., "count complete"); an enable bit for "counter up" instructions; and an enable bit for "counter down" instructions.

The remaining Data Table files, Status 294, Bit 296, Control 302, Integer 304, and Floating Point 306, can perform a number of different functions. The various functions of these Data Table files are not essential to an understanding of the present invention.

The PLC uses addresses to refer to words and bits in the Data Tables files 290–308. The addresses allow a ladder logic program to identify Data Table files, elements therein, and bits of the elements. Addresses are generally expressed as "<file type> <file number> : <element>. <subelement>/ <bit number>". Thus, the address "B3:10/1" means "Bit file type; File #3; Element #10; Bit #1".

Addresses of elements in the Output Image 290 and Input Image 292 Data Table files are specified in octal format, i.e., 00–07 and 10–17 are valid bit addresses. All of the other file types use decimal addresses for elements. Bit type 296 Data Table files are "wordless". Addresses entered in a "word/bit" format are converted by the software package into a bit-only format. For example, if address B3:10/1 is entered by the user, the software package converts it to B3/161 (10 words ×16 bits/words +1 bit). The Output Image 290, Input Image 292, and Status 294 files are unique in that their maximum sizes are set by the PLC processor type as shown in FIG. 15. The remaining file types 296–308 may contain a maximum of 1000 elements. File types may be duplicated as needed to allocate storage space. For example, if more timers than the 1000 available in file "T4" are needed, file "T9" can be created. Ideally, the user would assign timers (or other variables) sequentially to conserve memory.

As shown in FIG. 14, the ladder logic program 282 scanned by the processor of the PLC (and used to control the PLC) is a group of statements 284. These statements 284 are often displayed to programmers in a graphical manner comprising ladder diagrams and functional block instructions. Each statement 284, or "rung" of the ladder logic program 282, consists of at least one condition test 286 and at least one action 288 to be performed when the condition is met. When the condition 286 is met, the rung is "true" and some action 288 is taken, for example, a signal is transmitted, a counter is enabled, a timer is started, etc.

FIG. 16 shows an example "rung". If the input bit 01 has been turned "ON" 310 (i.e., a binary value of "1") by an input device, then the PLC responds by turning output bit 01 "ON" 312 (i.e., a binary value of "1").

The typical PLC is comprised of a number of categories of instructions, including a standard set of arithmetic, logical, move, diagnostic, register, comparison, and data transfer instructions, as would be found in any computer. Program control instructions are also available, allowing the user to structure the ladder logic programs.

In addition to the standard set of instructions, PLCs have a number of special-purpose machine control instructions. Relay-type instructions allow the PLC to monitor and control inputs and outputs for both digital and analog devices. Timer and counter instructions control interval timers and event counters. Sequencer instructions let the PLC monitor and control up to 16 I/0 status bits at the same time. Immediate I/0 instructions scan critical inputs or set critical outputs prior to normal I/0 scans. Control instructions are available to let the PLC perform proportional, integral, and derivative (PID) control of processes and equipment.

In prior art ladder logic development systems, programmers can develop ladder logic programs on-line or off-line from the PLC, communicate with the PLC on-line to monitor the program's status, troubleshoot the ladder logic program, force the status of I/0 status bits ON or OFF to simulate events, and perform a number of other functions. However, these prior art development systems offer little in the way of productivity aids for the ladder logic programmer and serve primarily as limited platforms for programming ladder logic.

SUMMARY OF THE INVENTION

To overcome the limitations in the prior art described above, and to overcome other limitations that will become apparent upon reading and understanding the present specification, the present invention discloses a method of creating custom screens for displaying the values and status of bits and words in a PLC as a ladder logic program executing therein is monitored.

The user creates a custom screen on a computer that references elements of the ladder logic program. These elements may reside in different words of different data table files. When the custom screens are displayed on the computer, they provide a window into user-selected locations of the data tables for monitoring the values of the elements. The current values of the elements displayed on the custom screen can be altered simply by entering new values on the custom screen. A library of custom screens can be maintained in the computer for later retrieval and re-use.

A custom screen is comprised of a plurality of cells. To create the custom screen, the user positions the cursor on a cell and enters an address for an element into the cell. Alternatively, the user can enter a symbol representing the element address into the cell. The symbol may chosen from a list of currently-defined symbols maintained by the computer. During monitoring, the user can position the cursor on the cell, invoke the cross-reference search, jump to a location in the ladder logic program, and, after exiting from the ladder logic program, return back to the custom screen.

The present invention also provides a method of monitoring a ladder logic program for a programmable logic controller using a timing chart. The user creates a bitmap on the computer that references elements in the ladder logic program. The elements may reside in different words of different data table files. The timing chart is displayed on the computer in a format determined by the bitmap. The timing chart thereby monitors the values of a number of elements. The bitmap can be stored on the computer for later retrieval and re-use.

A bitmap is comprised of a plurality of cells. To create the timing chart, the user positions the cursor on a cell and enters an address for a bit element into the cell. Alternatively, the user can enter a symbol representing the element address into the cell. The symbol may chosen from a list of currently-defined symbols maintained by the computer.

DESCRIPTION OF THE DRAWINGS

In the drawings, where like numerals refer to like elements throughout the several views.

FIG. 7 shows a custom screen wherein ten addresses and symbols have been entered into the cells;

FIG. 15 is an illustration describing the memory structure of the programmable logic controller;

FIG. 16 is an illustration describing the structure of a ladder logic rung;

FIG. 17 shows the structure of the custom screen file; and

FIG. 18 shows the structure of the Timing Chart Bitmap file.

DETAILED DESCRIPTION OF THE PREFERRED EMBODIMENT

In the following Detailed Description of the Preferred Embodiment, reference is made to the Drawings which form a part hereof, and in which is shown by way of illustration a specific embodiment in which the invention may be practiced. It is to be understood that other embodiments may be utilized and structural changes may be made without departing from the scope of the present invention.

General Description

The software package embodying the present invention is a menu driven system used to develop ladder logic programs for Programmable Logic Controllers (PLCs). The software package is a programmer's "tool box" for developing ladder logic programs and includes: (1) off-line program development; (2) off-line processor emulation; (3) on-line program development; and (4) on-line station monitoring. Off-line program development provides the user the ability to develop ladder logic programs without connection to a PLC processor. Off-line emulation provides a user the ability to execute and debug ladder programs without the use of a PLC processor. On-line program development provides the user the ability to develop ladder logic programs while being connected to a PLC processor.

Additional information regarding this software package is available in the co-pending and commonly assigned patent applications "A METHOD AND APPARATUS FOR SYMBOLIC LADDER LOGIC PROGRAMMING WITH AUTOMATIC ATTACHMENT OF ADDRESSES", by Zifferer et al., "A METHOD AND APPARATUS FOR CROSS-REFERENCE SEARCHING IN LADDER LOGIC PROGRAMS", by Zifferer et al., "A METHOD AND APPARATUS FOR OFF-LINE EMULATION FOR LADDER LOGIC PROGRAMS", by Zifferer et al., and "A METHOD AND APPARATUS FOR SECURING ACCESS TO A LADDER LOGIC PROGRAMMING AND MONITORING SYSTEM", by Zifferer et al., all of which applications were filed on even date herewith, and all of which applications are hereby incorporated by reference.

Custom Data Monitor

Figure 1:
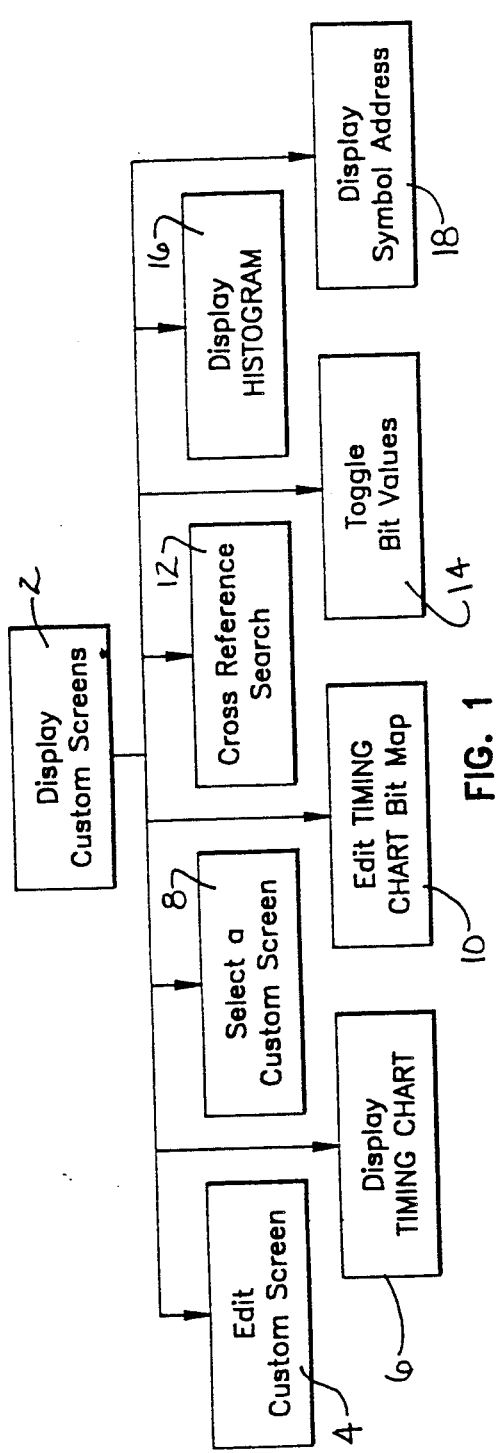
FIG. 1 is a block diagram describing the options available during data monitoring.

FIG. 1 is a block diagram describing the options 2-18 available in the Custom Data Monitor. The Custom Data Monitor is designed to simplify troubleshooting by giving the user the tools to develop screens that act as windows into the user-selected Data Table locations in the PLC. The user may build custom data monitoring screens and monitor variables for changes as the ladder logic program executes.

The Custom Data Monitor permits the user to access, view, edit words and bits in multiple Data Table locations. An advanced data mask function lets the user select words and bits from anywhere in the Data Table files for simultaneous monitoring. The values of the words and bits being monitored may be altered by positioning the cursor thereon, typing in the new value, and pressing the Enter key.

Figure 5:
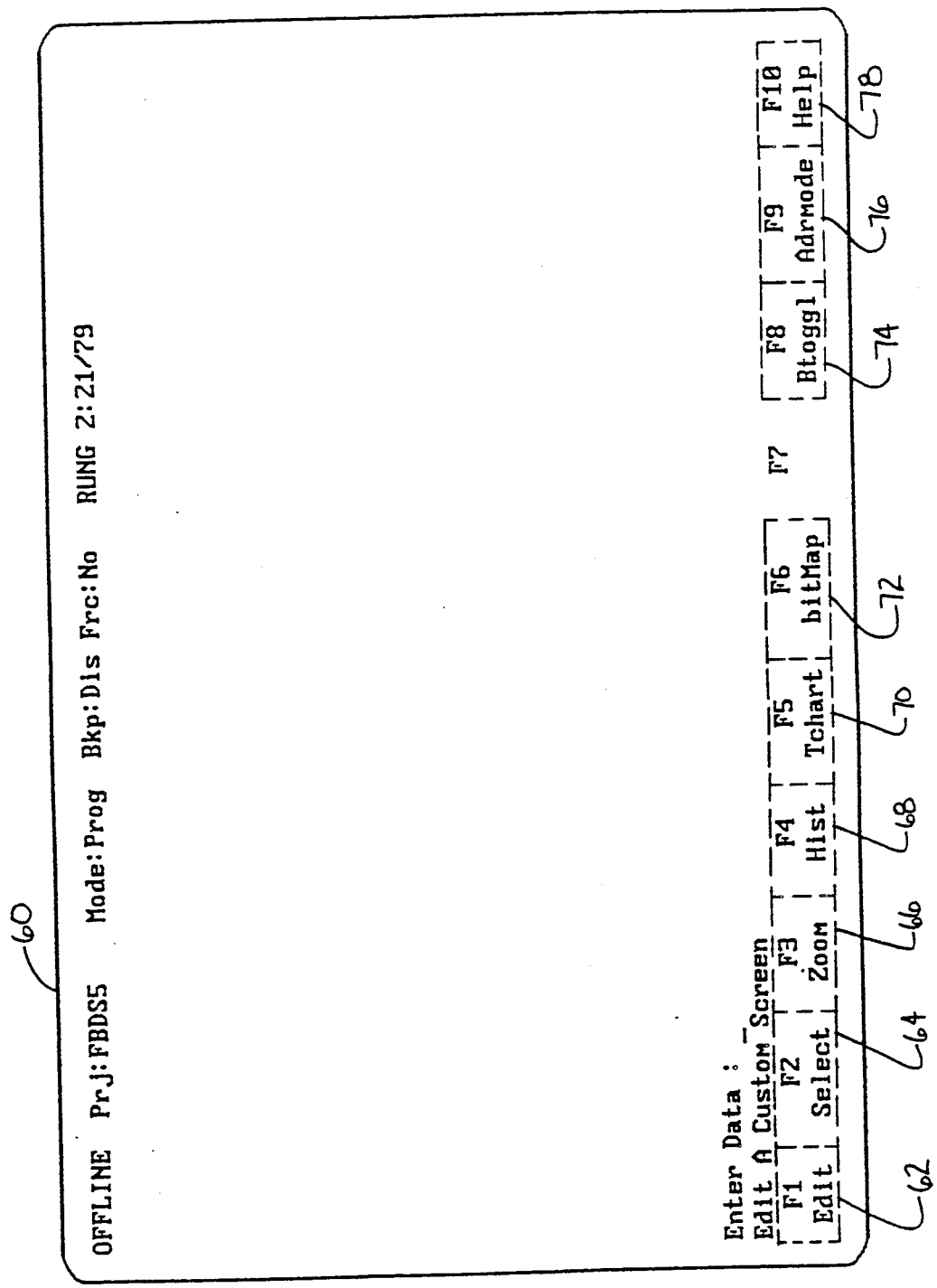
FIG. 5 shows a blank "custom screen"

FIG. 5 shows a blank "custom screen" 60. Above each function key identifier 62-78 across the bottom of FIG. 5, there is a description of the function performed. When a function key 62-78 is selected by the user, the cursor highlights the particular function description. Nine different functions 62-78 are available from the Custom Data Monitor mode: editing of custom screens by pressing the F1 (Edit) key 62; selecting a custom screen by pressing the F2 (Select) key 64; cross-reference searching by pressing the F3 (Zoom) key 66; displaying a contact histogram by pressing the F4 (Hist) key 68; displaying a bit timing chart by pressing the F5 (Tchart) key 70; defining the bits displayed on the timing chart by pressing the F6 (bitMap) key 72; toggling the bit at the currently defined cursor position by pressing the F8 (bToggle) key 74; and displaying by symbols in an address mode by pressing the F9 (Adrmode) key 76.

Screen Editing

Figure 2:
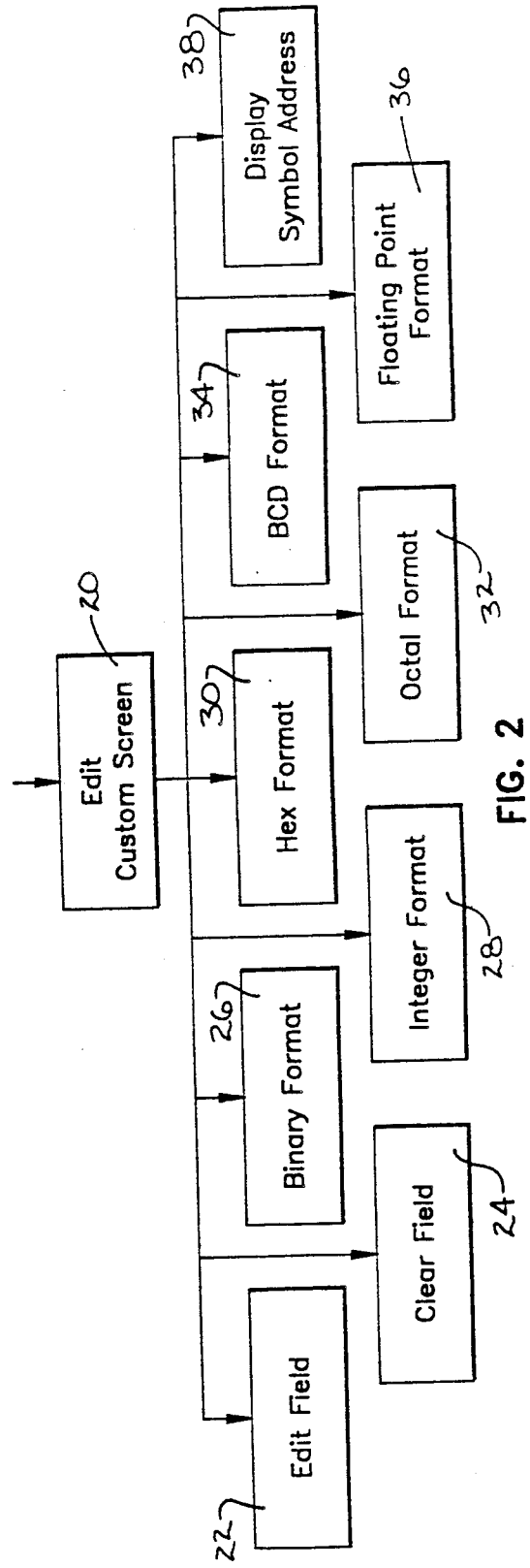
FIG. 2 is a block diagram describing the options available for editing custom screen displays.

FIG. 2 is a block diagram describing the options 20-36 available for creating and editing custom screens. The power of a custom screen comes from its ability to monitor bits and words of different elements from a plurality of different Data Table files. Thus, the user can use a single custom screen to monitor disparate parts of a ladder logic program. Once created, a custom screen can be saved on disk for later retrieval and re-use.

The screen editor is invoked when the user presses the F1 (Edit) key 62 in FIG. 5. There are a plurality of cells on the screen 60. The cursor can be positioned to any cell on the screen 60. An address, or a symbol representing an address, is entered into the cell. Alternatively, the user can press the Insert key, and select a symbol from a list of currently defined symbols.

Figure 6:
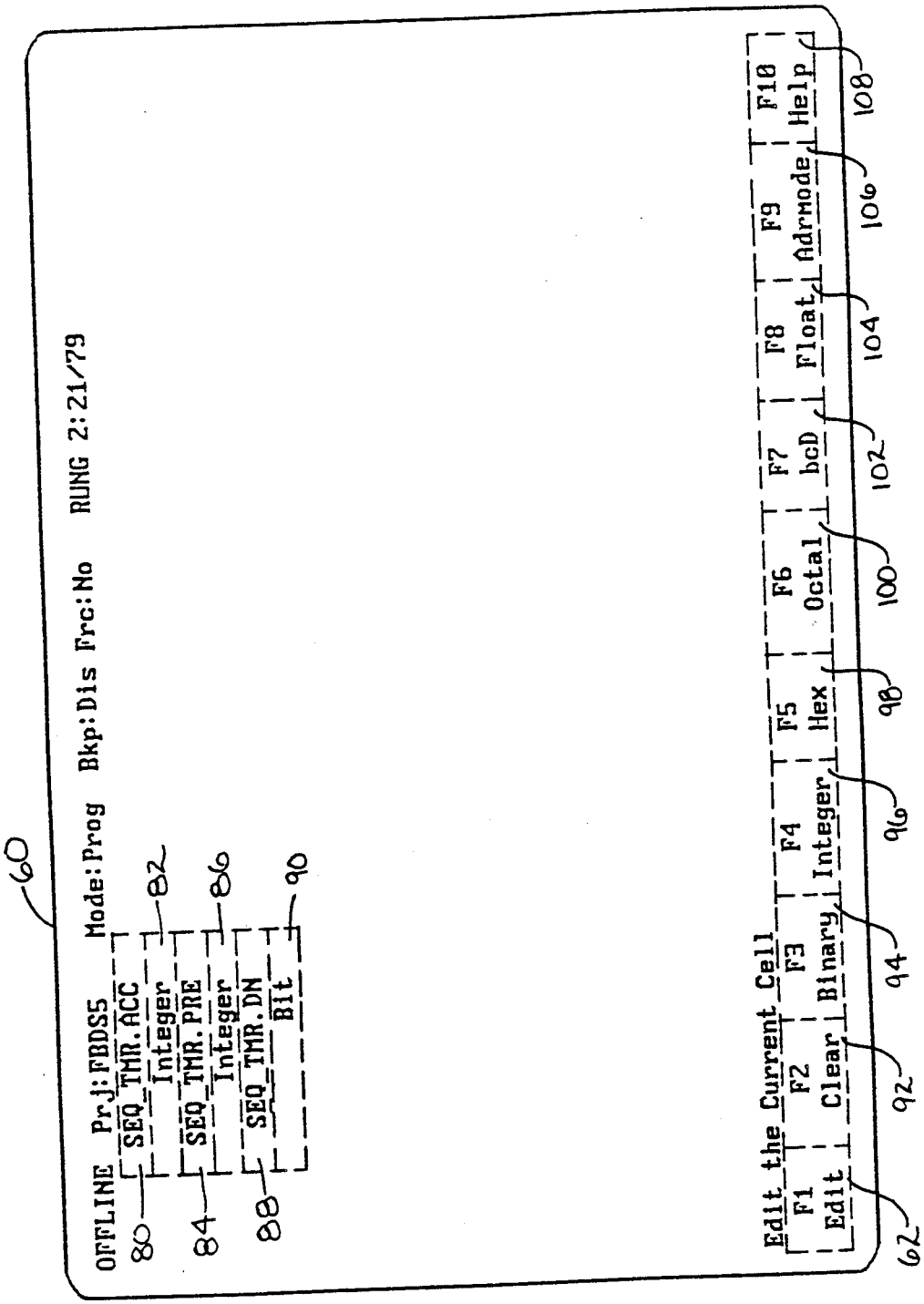
FIG. 6 shows a custom screen, wherein three symbols have been entered into three cells.

FIG. 6 shows a custom screen 60, wherein three symbols 80, 84 and 88 have been entered into three cells. Symbols or addresses are entered into cells by positioning the cursor on the cell and pressing the F1 (Edit) key 62. A cell can be erased by positioning the cursor and pressing the F2 (Clear) key 92. Cell data can be displayed in several different radix, by pressing function keys, including binary (F3) 94, integer (F4) 96, hexadecimal (F5) 98, octal (F6) 100, Binary Coded Decimal (F7) 102, and floating point (F8) 104. The address equivalents of symbols can be displayed by pressing the F9 (Adrmode) key 106.

In FIG. 6, the symbol SEQ_TMR.ACC 80 identifies the Accumulator Value for the timer attached to symbol SEQ_TMR. This is an integer value as indicated by the legend "Integer" 82 directly beneath the symbol SEQ_TMR.ACC 80 in FIG. 6. The symbol SEQ_TMR.PRE 84 identifies the Preset Value for the timer attached to symbol SEQ_TMR. This is an integer value as indicated by the legend "Integer" 86 directly beneath the symbol SEQ_TMR.PRE 84 in FIG. 6. The symbol SEQ_TMR.DN 88 identifies the "done" bit for the timer attached to symbol SEQ_TMR. This is an bit value as indicated by the legend "Bit" 90 directly beneath the symbol SEQ_TMR.DN 88 in FIG. 6.

FIG. 7 shows a custom screen 60 wherein ten addresses and symbols 80, 84, 88, 110, 114, 118, 122, 126, 130 and 134 have been entered into the cells. FIG. 7 includes two different timers and their various parts 80-90 and 110-120, and four I/0 bit addresses 122-136. The symbol SEQ_TMR.ACC 80 identifies the Accumulator Value for the timer attached to symbol SEQ_TMR. This is an integer value as indicated by the legend "Integer" 82 directly beneath the symbol SEQ_TMR.ACC 80 in FIG. 7. The symbol SEQ_TMR.PRE 84 identifies the Preset Value for the timer attached to symbol SEQ_TMR. This is an integer value as indicated by the legend "Integer" 86 directly beneath the symbol SEQ_TMR.PRE 84 in FIG. 7. The symbol SEQ_TMR.DN 88 identifies the "done" bit for the timer attached to symbol SEQ_TMR. This is an bit value as indicated by the legend "Bit" 90 directly beneath the symbol SEQ_TMR.DN 88 in FIG. 7. The symbol FRUIT_BRAN_TMR.ACC 110 identifies the Accumulator Value for the timer attached to symbol FRUIT_BRAN_TMR. This is an integer value as indicated by the legend "Integer" 112 directly beneath the symbol FRUIT_BRAN_TMR.ACC 110 in FIG. 7. The symbol FRUIT_BRAN_TMR.PRE 114 identifies the Preset Value for the timer attached to symbol FRUIT_BRAN_TMR. This is an integer value as indicated by the legend "Integer" 116 directly beneath the symbol FRUIT_BRAN_TMR.PRE 114 in FIG. 7. The symbol FRUIT_BRAN_TMR.DN 118 identifies the "done" bit for the timer attached to symbol FRUIT_BRAN_TMR. This is an bit value as indicated by the legend "Bit" 120 directly beneath the symbol FRUIT_BRAN_TMR.DN 118 in FIG. 7. The address I:000/00 122 identifies bit zero (the first bit) in the input image table for the I/0 module in rack #0, group #0, and slot #0. This is a bit value as indicated by the legend "Bit" 124 directly beneath the address I:000/00 122 in FIG. 7. The address I:000/01 126 identifies bit one (the second bit) in the input image table for the I/0 module in rack #0, group #0, and slot #0. This is a bit value as indicated by the legend "Bit" 128 directly beneath the address I:000/01 126 in FIG. 7. The address O:000/00 130 identifies bit zero (the first bit) in the output image table for the I/0 module in rack #0, group #0, and slot #0. This is a bit value as indicated by the legend "Bit" 132 directly beneath the address O:000/00 130 in FIG. 7. The address O:000/01 134 identifies bit one (the second bit) in the output image table for the I/0 module in rack #0, group #0, and slot #0. This is a bit value as indicated by the legend "Bit" 136 directly beneath the address O:000/01 134 in FIG. 7.

FIG. 17 shows describes a database file 314 that stores the custom screens. Each file 314 can comprise a plurality of cells, for example, the 40 cells 316-326 shown in FIG. 17. Each cell in the custom screen is comprised of a PLC address 316, and a radix identifier 318. The software package can translate symbols into PLC addresses by referencing the attachment file described in the co-pending application entitled "A METHOD AND APPARATUS FOR SYMBOLIC LADDER LOGIC PROGRAMMING WITH AUTOMATIC ATTACHMENT OF ADDRESSES" by Zifferer et al., which application was incorporated by reference herein earlier.

Data Monitoring

Returning now to the FIG. 5 screen, the Monitor mode is invoked when a custom screen 60 is selected 64. In the Monitor mode, the user can observe the values of bits and words as the bits and words are altered in the Data Table files. This data monitoring occurs in real-time, displaying bit and word values in the ladder logic program scanned by the PLC or the Emulator.

Figure 8:
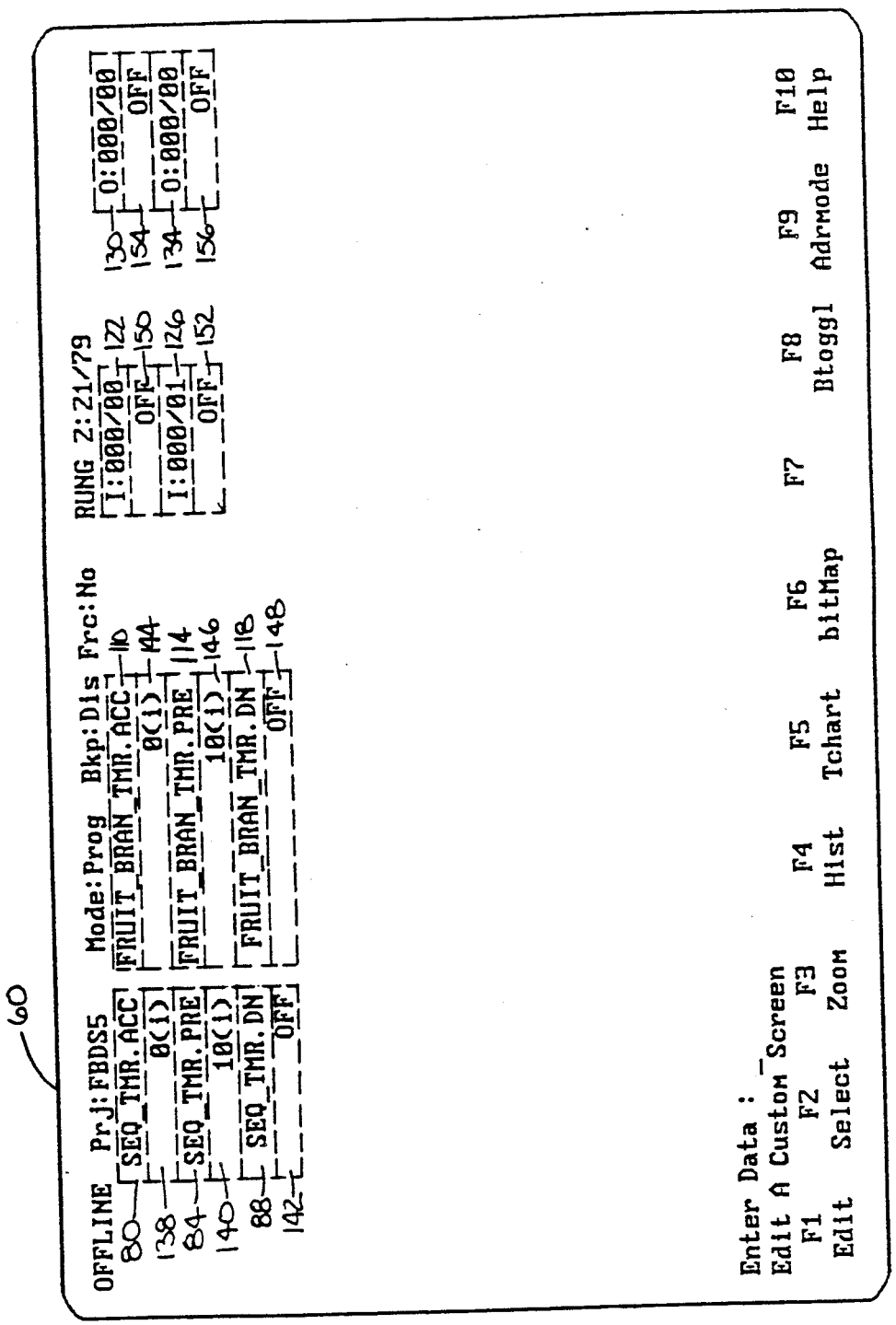
FIG. 8 shows the custom screen of FIG. 7 operating in the Monitor mode, wherein the bit status and timer values are displayed.

FIG. 8 shows the custom screen 60 of FIG. 7 operating in the Monitor mode, wherein the bit status and timer values are shown. Bit values are indicated by the "OFF" legends 142, 148, 150, 152, 154 and 156 underneath the symbols 88 and 118 and addresses 122, 126, 130 and 134. Word values are indicated by the "0(i)" 138 and 144 and "10(i)" 140 and 146 legends underneath the symbols 80, 84, 110 and 114 (the "(i)" designator indicates an integer format value). In the Monitor mode, the user can observe the change in status and values for all the addresses 122, 126, 130 and 134 and symbols 80, 84, 88, 110, 114 and 118. The user can also change word 138, 140, 144 and 146 and bit 142, 148, 150, 152, 154 and 156 values in the Data Table files by positioning the cursor on the desired element and entering the new value.

Figure 9:
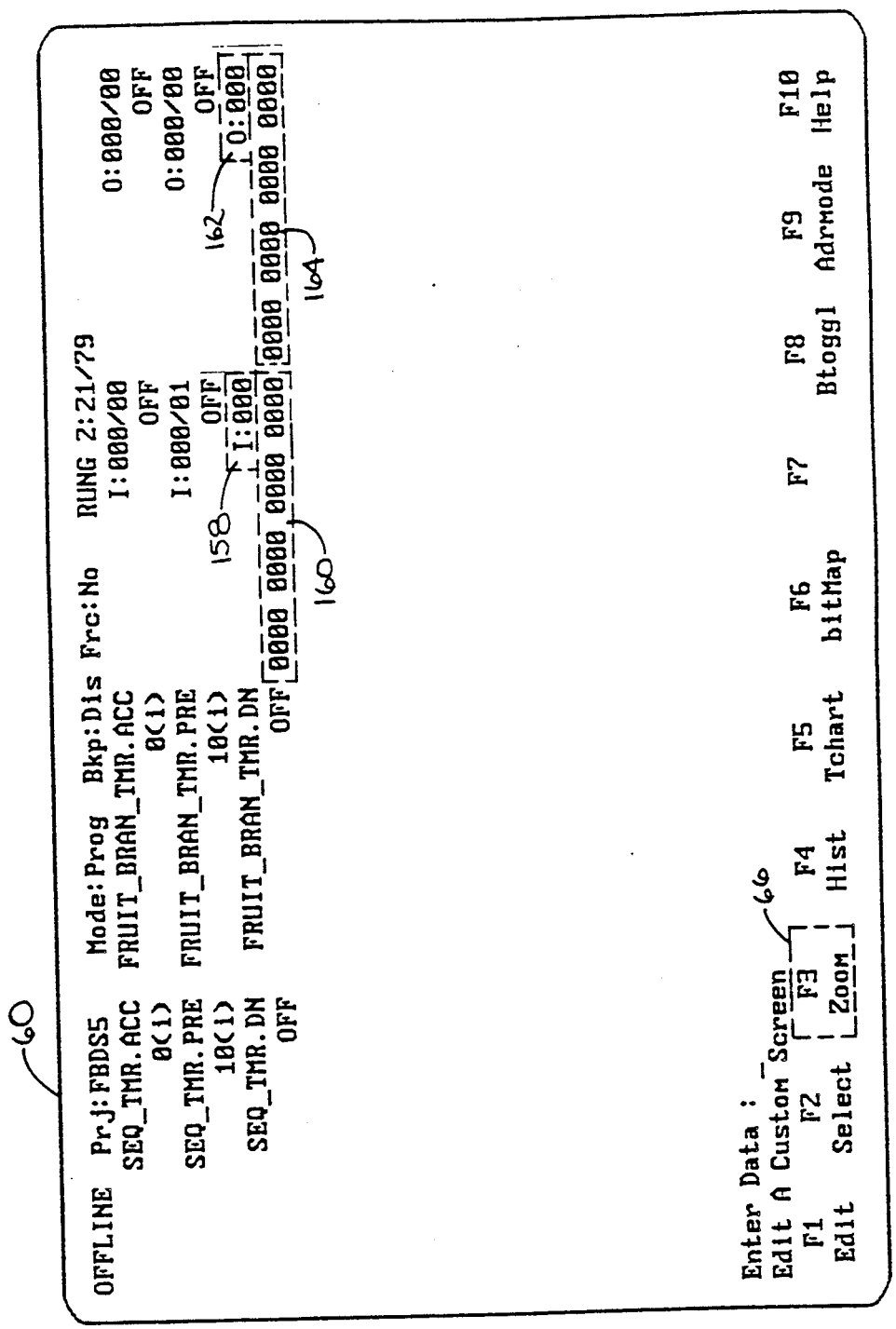
FIG. 9 shows a custom screen operating in the Monitor mode, wherein all 16 bits of input address I:000 and all 16 bits of output address O:000 are displayed with the elements from FIG. 8.

FIG. 9 shows a custom screen 60 operating in the Monitor mode, wherein all 16 bits 160 of input address I:000 158 and all 16 bits 164 of output address O:000 162 are displayed with the elements from FIG. 8. FIG. 9 demonstrates that the status of an entire I/0 module can be observed on the custom screen.

From the custom screen 60, the user can use the Zoom option, invoked by pressing the F3 (Zoom) key 66, to display a cross-reference list of symbols. From the cross-reference list, the user can "jump" to a rung in the ladder logic program where the symbol is used. This cross-reference list is more fully described in the co-pending patent application "A METHOD AND APPARATUS FOR CROSS-REFERENCE SEARCHING IN LADDER LOGIC PROGRAMS", by Zifferer et al., which application was incorporated by reference herein earlier. Thus, not only can the user monitor the ladder logic program, the user can also perform diagnostic operations, for example, changing the Preset Value of a timer.

Timing Charts

Figure 3:
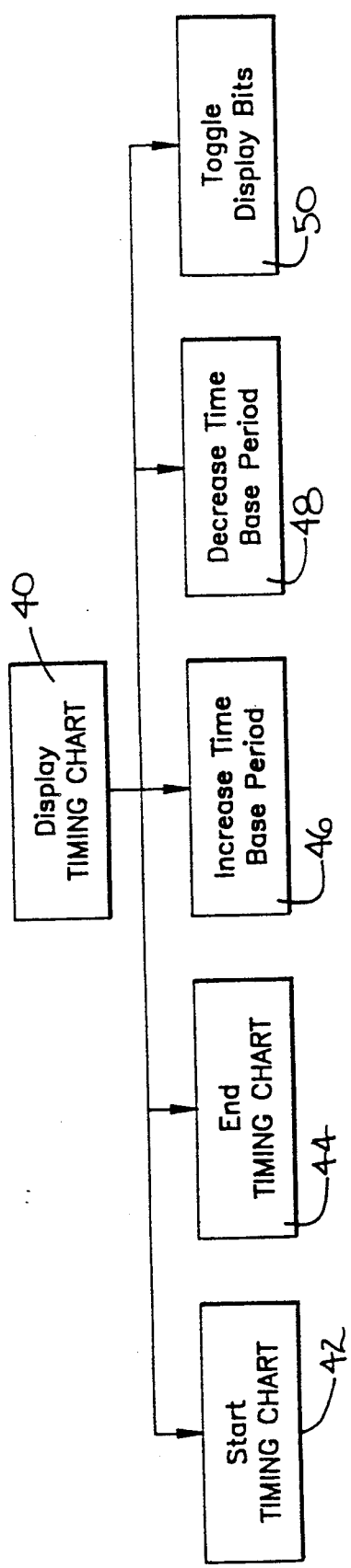
FIG. 3 is a block diagram describing the options available when Timing Charts are displayed.

FIG. 3 is a block diagram describing the options 40-50 available when Timing Charts are displayed. The Timing Chart option allows the user to graphically observe the changing values of bits and words in the Data Table files. The Timing Chart option works in real-time, displaying the changing values of bits and words in the ladder logic program scanned by the PLC or the Emulator.

Figure 10:
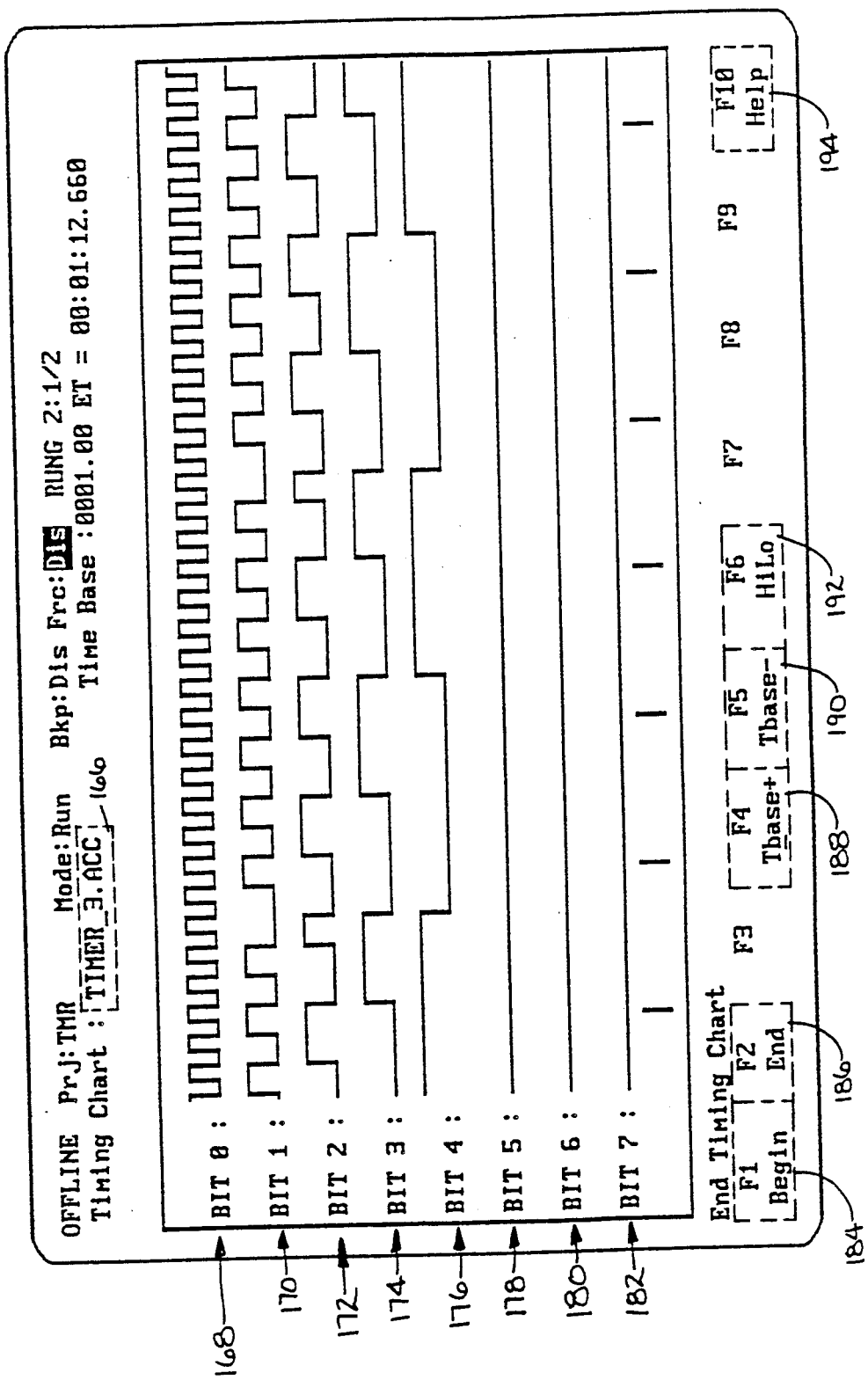
FIG. 10 shows a timing chart for a plurality of bits for the symbol TIMER_3.ACC, which is the timer Accumulator Value for the address T4:3.

Returning now to the FIG. 5 screen, the Timing Chart option is invoked by the user pressing the F5 (Tchart) key 70. FIG. 10 shows a Timing Chart for the symbol TIMER—3.ACC 166, which is the timer Accumulator Value for the address T4:3. A number of functions 184-194 are available for developing and controlling a Timing Chart. Pressing the F1 (Begin) key 184 starts the tracking and displaying of bit transitions on the Timing Chart. Pressing the F2 (End) key 186 stops the gathering of data for the Timing Chart. The default time base or acquisition period is one second. Pressing the F4 (Tbase+) key 188 increases the time between samples on the Timing Chart. Pressing the F5 (Tbase−) key 190 decreases the time period between samples on the Timing Chart. The Timing Chart displays all 16 bits of the specified word, but only the eight "low" bits 168-182 are displayed on in FIG. 10. The high and low bits can be toggled by pressing the F6 (HiLo) key 192. Screen size limitation prevents all 16 bits from being displayed simultaneously.

Editing The Timing Chart Bitmap

Figure 4:
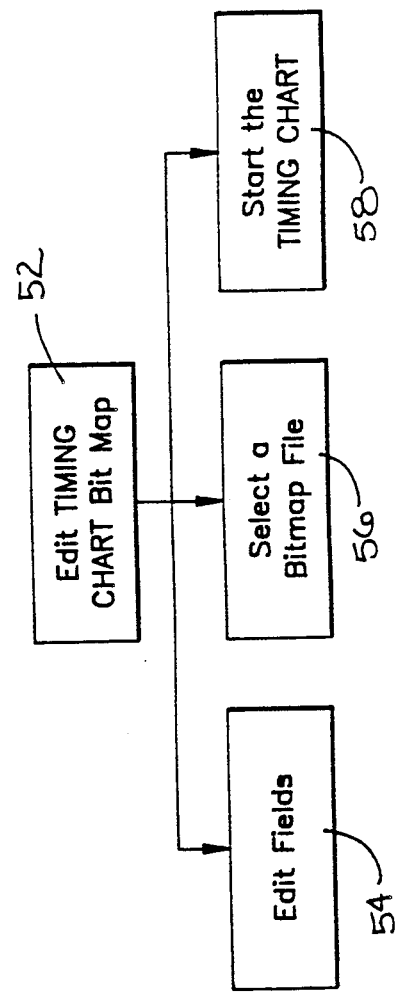
FIG. 4 is a block diagram describing the options available for editing Bitmaps of the Timing Chart.

FIG. 4 is a block diagram describing the options 52-58 available for editing Timing Chart Bitmaps. The Bitmap option allows the user to specify which bits to display with the Timing Chart. The standard Timing Chart assumes that all the bits needed for the chart are contained in a single word in a Data Table file. Symbolic names or addresses can be used to specify each bit in the Timing Chart. In addition, any combination of words, bits, or I/0 addresses can be specified for inclusion in a Timing Chart. To accomplish the Bitmap function, ladder logic rungs will be written by the software package to pack these scattered bits into a single word, thus guaranteeing the accuracy of the Timing Chart.

Figure 11:
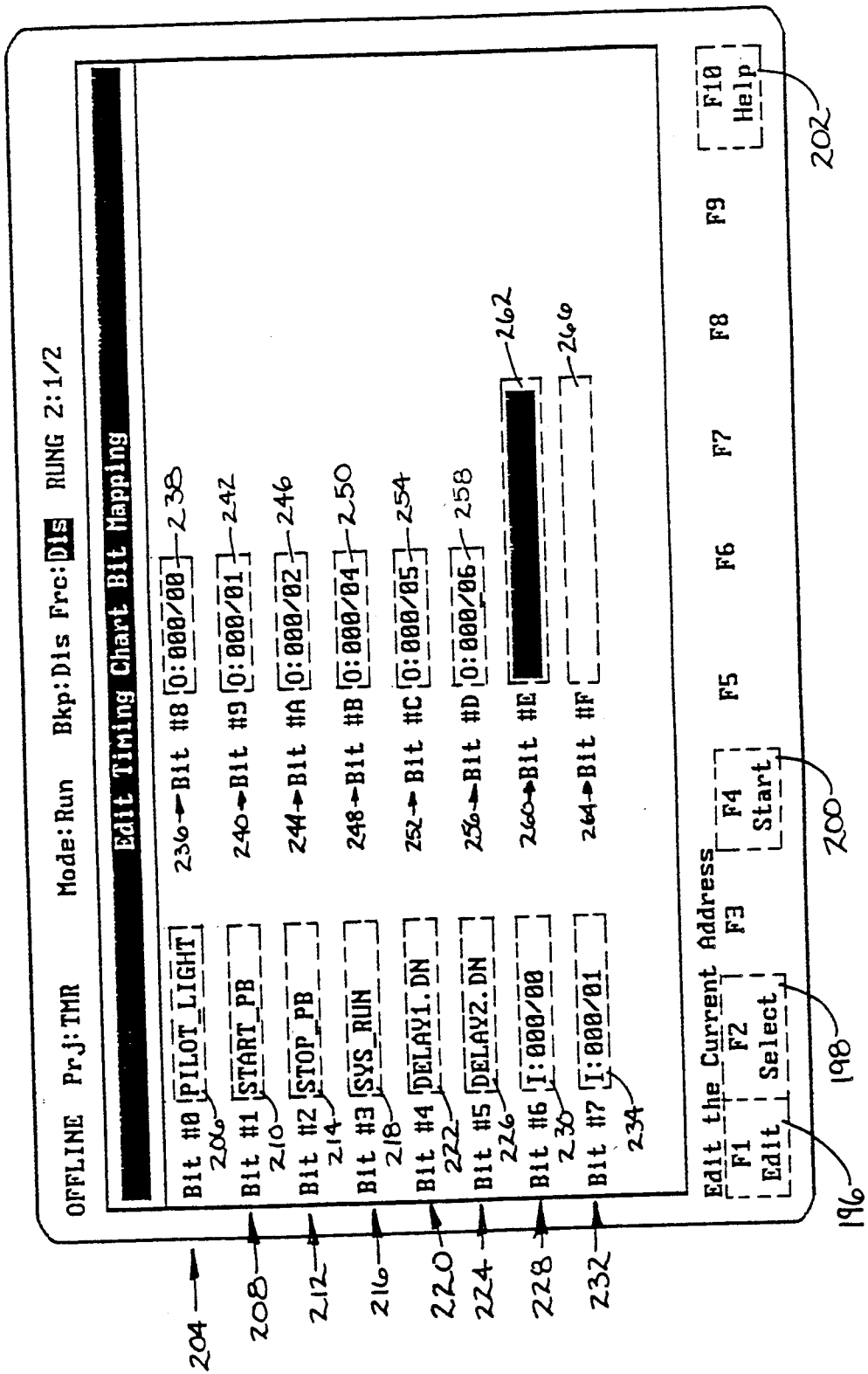
FIG. 11 shows an example of the Bitmap option that allows a user to edit the Timing Chart.
Figure 12:
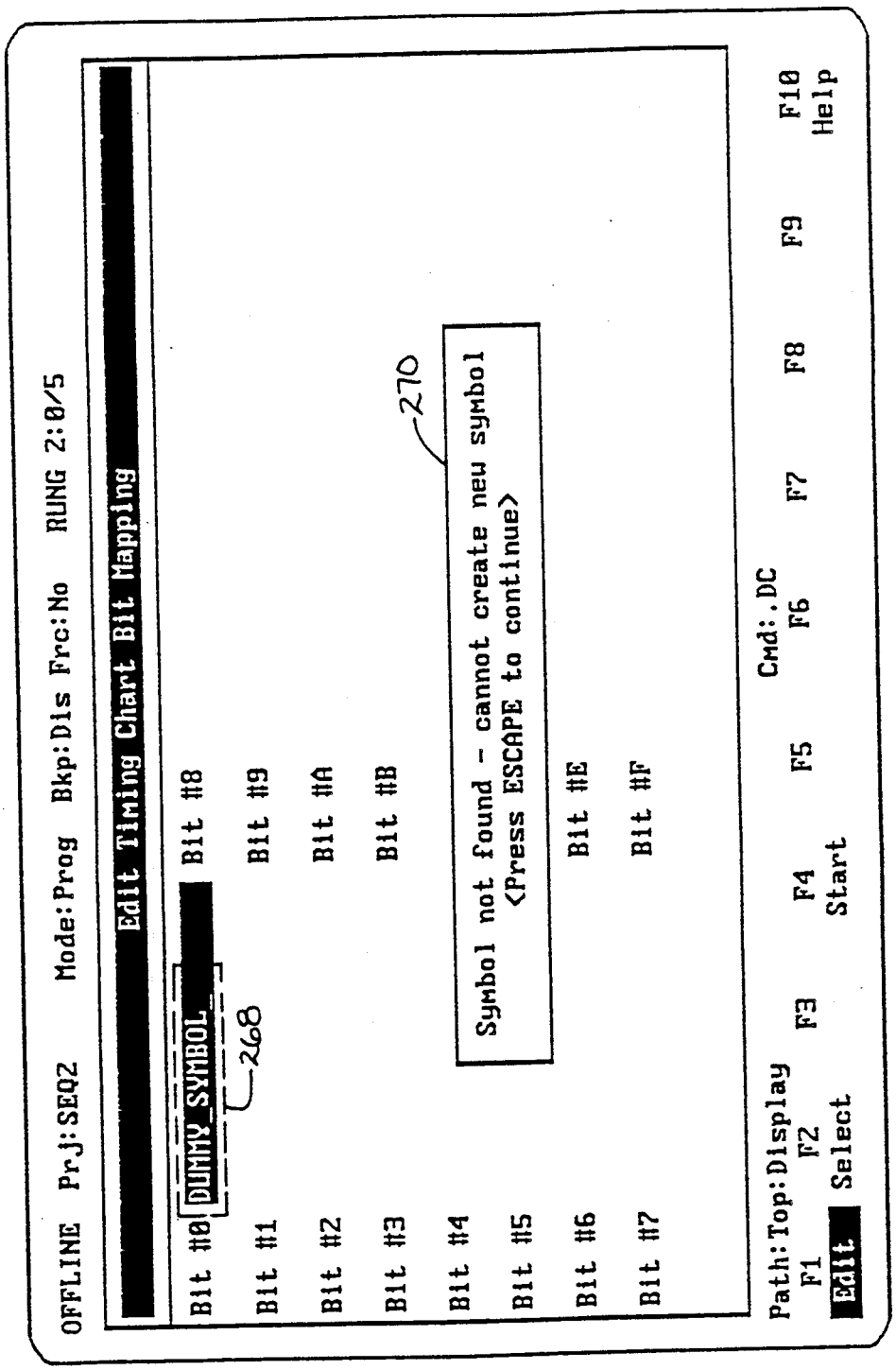
FIG. 12 shows an error message which is displayed when the user enters an invalid address or symbol into a Bitmap field.
Figure 13:
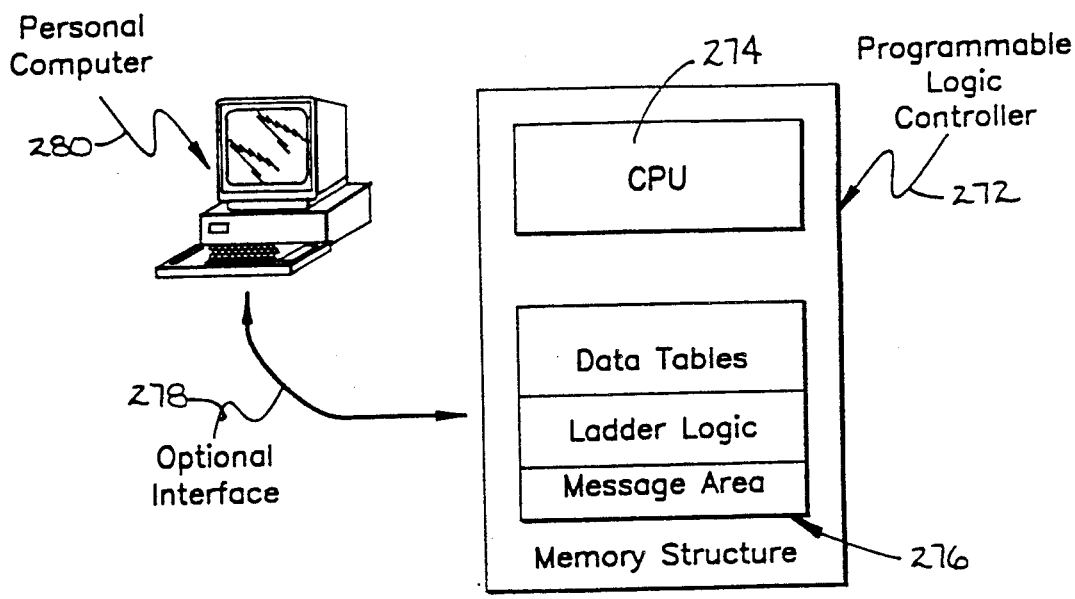
FIG. 13 is an illustration describing a programmable logic controller with an optional computer attached thereto.
Figure 14:
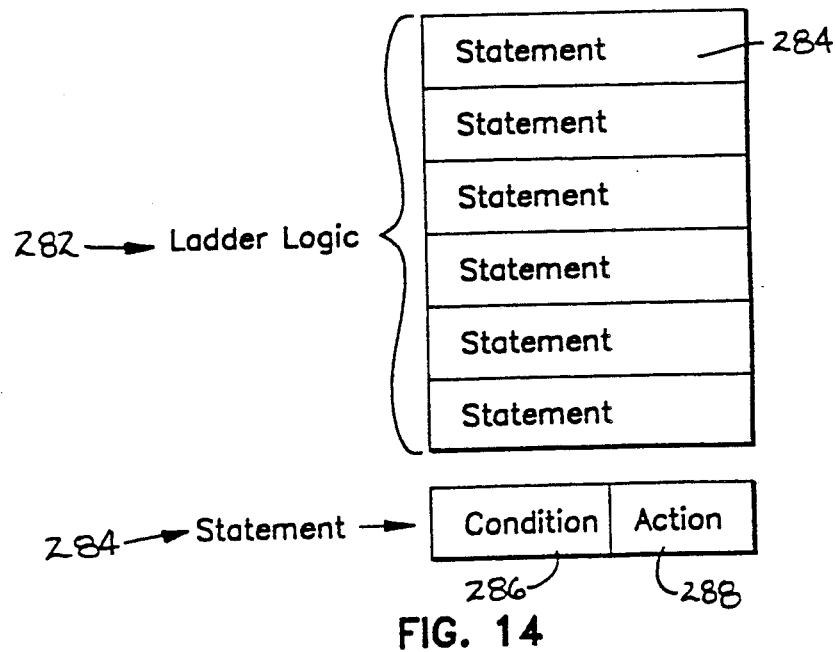
FIG. 14 is, an illustration describing the structure of a ladder logic program in the programmable logic controller.

Returning now to the FIG. 5 screen, the Bitmap option is invoked by pressing the F6 (bitMap) key 72. FIG. 11 shows an example of the Bitmap option that allows a user to edit a Timing Chart. The user may edit the Bitmap fields 206, 210, 214, 218, 222, 226, 230, 234, 238, 242, 246, 250, 254, 258, 262 and 266 by pressing the F1 (Edit) key 196. The user must enter a valid address or symbol into the field, otherwise an error message 270 is displayed as shown in FIG. 12. Pressing the F2 (Select)

key 198 allows the user to select another Bitmap file. Any number of Bitmaps can be stored on disk, thus making it possible to display any number of Timing Charts on demand. Pressing the F4 (Start) key 200 starts the Timing Chart.

FIG. 18 shows describes a database file 328 that maintains the Timing Chart Bitmaps. Each file 328 can comprise a plurality of bits, for example, the 16 bits 330-342 shown in FIG. 18. Each record 330-342 in the Bitmap file is comprised of a PLC address for a particular bit. The software package can translate symbols into PLC addresses by referencing the attachment file described in the co-pending application entitled "A METHOD AND APPARATUS FOR SYMBOLIC LADDER LOGIC PROGRAMMING WITH AUTOMATIC ATTACHMENT OF ADDRESSES" by Zifferer et al., which application was incorporated by reference herein earlier.

Conclusion

Although a specific embodiment of the present invention has been illustrated herein, it will be appreciated by those in ordinary skill in the art that any method or arrangement which is calculated to achieve the same purpose may be substituted for the specific embodiment shown. Thus, the present invention disclosed herein may be implemented through the use of different display screens, different commands, different key combinations, and different steps. This application is intended to cover any adaptations or variations thereof. Therefore, it is manifestly intended that this invention be limited only by the claims and the equivalence thereof.

What is claimed is:

1. A computer-implemented system for monitoring elements of a ladder logic program executing in a programmable logic controller, comprising:
   (a) monitor means for displaying custom screens and timing charts on the computer, wherein the custom screens display changing element values in the ladder logic program using numeric representations, and wherein the timing charts display changing element values in the ladder logic program using transition representations; and
   (b) editor means, coupled to the monitor means, for developing the custom screens and the timing charts on the computer, for entering new element values at the computer while the custom screens are displayed, and for communicating the new element values to the ladder logic program executing in the programmable logic controller.

2. The apparatus of claim 1, wherein the monitor means further comprises means for displaying symbols representing the elements in conjunction with the changing element values.

3. The apparatus of claim 1, wherein the monitor means further comprises means for selectively formatting the changing element values according to a user-selected radix.

4. The apparatus of claim 3, wherein the monitor means further comprises means for displaying a legend on the computer identifying the user-selected radix.

5. The apparatus of claim 1, wherein the editor means further comprises data mask means for specifying that only portion of the changing element values are to be displayed on the custom screens and timing chart screens.

6. The apparatus of claim 1, wherein the editor means further comprises means for selecting an element for display by choosing a symbol representing the element from a list of previously-defined symbols maintained and displayed by the computer.

7. The apparatus of claim 1, wherein the editor means further comprises means for string the custom screens and the timing charts in a database file on the computer, wherein the database file is comprised of an address for the element and a radix identifier for indicating a display format for the element.

8. The apparatus of claim 1, further comprising:
   (c) means for selecting an element displayed on the computer;
   (d) means for invoking a cross-reference search for the selected element, the cross-reference search displaying indicators of locations in the ladder logic program where the selected element is referenced; and
   (e) means for selecting one of the indicators and displaying the corresponding location in the ladder logic program on the computer.

9. The apparatus of claim 8, further comprising means for re-displaying the custom screen upon exiting the ladder logic program.

10. A computer-implemented method of monitoring elements of ladder logic programs executing in programmable logic controllers, comprising:
    (a) developing custom screens and timing charts on the computer by specifying the elements to be displayed therein;
    (b) displaying the custom screens and timing charts on the computer, wherein the custom screens display changing element values in he ladder logic program using numeric representations, and wherein the timing charts display changing element values in the ladder logic program using transition representations; and
    (c) entering new element values at the computer while the custom screens are displayed, and communicating the new element values to the ladder logic program executing in the programmable logic controller.

11. The method of claim 10, wherein the displaying step further comprises displaying symbols representing the elements in conjunction with the changing element values.

12. The method of claim 10, wherein the displaying step further comprises selectively formatting the changing element values according to a user-selected radix.

13. The method of claim 12, wherein the displaying step further comprises displaying a legend on the computer identifying the user-selected radix.

14. The method of claim 10, wherein the developing step further comprises specifying that only portions of the changing element values are to be displayed on the custom screens and the timing charts.

15. The method of claim 10, wherein the developing step further comprises selecting an element for display by choosing a symbol representing the element from a list of previously-defined symbols maintained and displayed by the computer.

16. The method of claim 10, wherein the developing step further comprises storing the custom screens and the timing charts in a database file on the computer, wherein the database file is comprised of an address for the element and a radix identifier for indicating a display format for the element.

17. The method of claim 10, further comprising:
    (d) selecting an element displayed on the computer;

(e) invoking a cross-reference search for the selected element, the cross-reference search displaying indicators of locating in the ladder logic program where the selected element is referenced; and (f) selecting one of the indicators and displaying the corresponding location in the ladder logic program on the computer.

18. The method of claim 17, further comprising redisplaying the custom screen upon exiting the ladder logic program.

* * * * *

UNITED STATES PATENT AND TRADEMARK OFFICE
CERTIFICATE OF CORRECTION

PATENT NO. : 4,991,076

DATED : February 5, 1991

INVENTOR(S) : Scott C. Zifferer, et al.

It is certified that error appears in the above-identified patent and that said Letters Patent is hereby corrected as shown below:

In column 2, line 17, please insert --.-- after the word "Values".

In column 4, line 49, please delete "," after the word "is".

In column 6, line 45, "122." should read --122,--; "126." should read --126,--.

In column 9, line 63, please delete "portion" and substitute therefore --portions--.

In column 10, line 4, please delete "string" and substitute therefore --storing--.

In column 10, line 32, please delete "he" and substitute therefore --the--.

Signed and Sealed this

Twenty-eighth Day of July, 1992

Attest:

DOUGLAS B. COMER

Attesting Officer

Acting Commissioner of Patents and Trademarks